(12) United States Patent
Yasui

(10) Patent No.: US 6,957,008 B1
(45) Date of Patent: Oct. 18, 2005

(54) IMAGE EDITING APPARATUS AND RECORDING MEDIUM

(75) Inventor: Michiaki Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1067 days.

(21) Appl. No.: 09/679,106

(22) Filed: Oct. 4, 2000

(30) Foreign Application Priority Data

Oct. 5, 1999 (JP) .................................. 11-283867

(51) Int. Cl.[7] ............................................. H04N 5/91
(52) U.S. Cl. .......................................... 386/55; 386/65
(58) Field of Search ............................. 386/46, 52, 55, 386/65

(56) References Cited

U.S. PATENT DOCUMENTS

| | | | |
|---|---|---|---|
| 5,781,730 A | | 7/1998 | Reimer et al. |
| 5,926,603 A | * | 7/1999 | Tanaka et al. ................ 386/53 |
| 6,449,422 B1 | * | 9/2002 | Ebisawa ..................... 386/52 |
| 6,477,315 B1 | * | 11/2002 | Ohomori ..................... 386/55 |
| 6,571,051 B2 | * | 5/2003 | Savoie ....................... 386/55 |

FOREIGN PATENT DOCUMENTS

| | | |
|---|---|---|
| EP | 0 750 265 | 12/1996 |
| GB | 2 328 551 | 2/1999 |
| JP | 4 43779 | 2/1992 |
| WO | WO 00 10329 | 2/2000 |

* cited by examiner

Primary Examiner—Huy Nguyen
(74) Attorney, Agent, or Firm—Frommer Lawrence & Haug LLP; William S. Frommer; Thomas F. Presson

(57) ABSTRACT

This invention relates to a materials sending apparatus for creating an edit list of an material including one or both of video data and audio data and sending the material, comprising: edit list creating means for creating an edit list containing information associated with an edit point of the material and information associated with a destination on which the material is recorded; reconfiguring means for splitting the edit list for each recording destination on which the material is recorded and reconfiguring the edit list for the each recording destination; and materials output means for outputting the material edited on the basis of the reconfigured edit list.

16 Claims, 10 Drawing Sheets

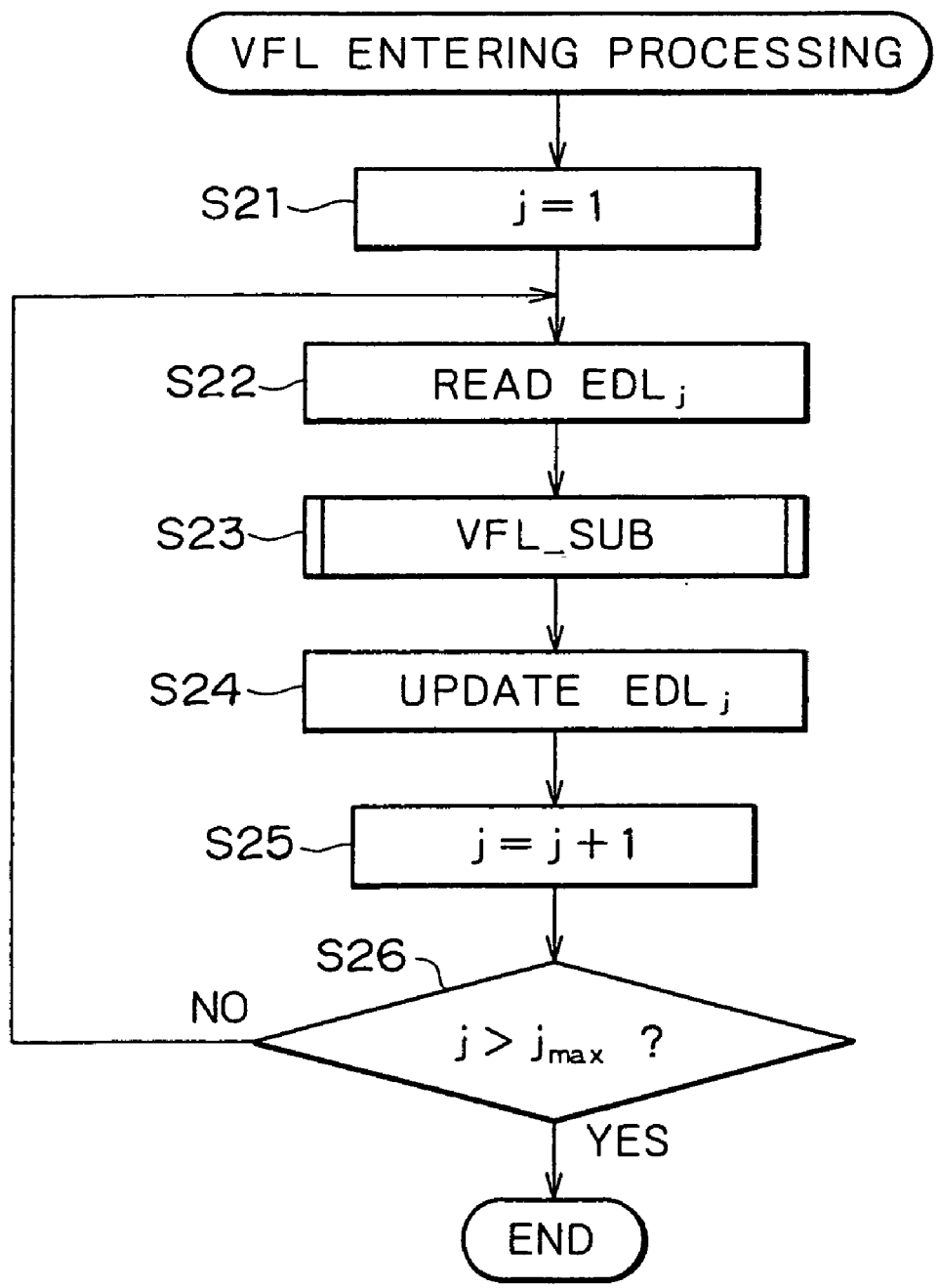

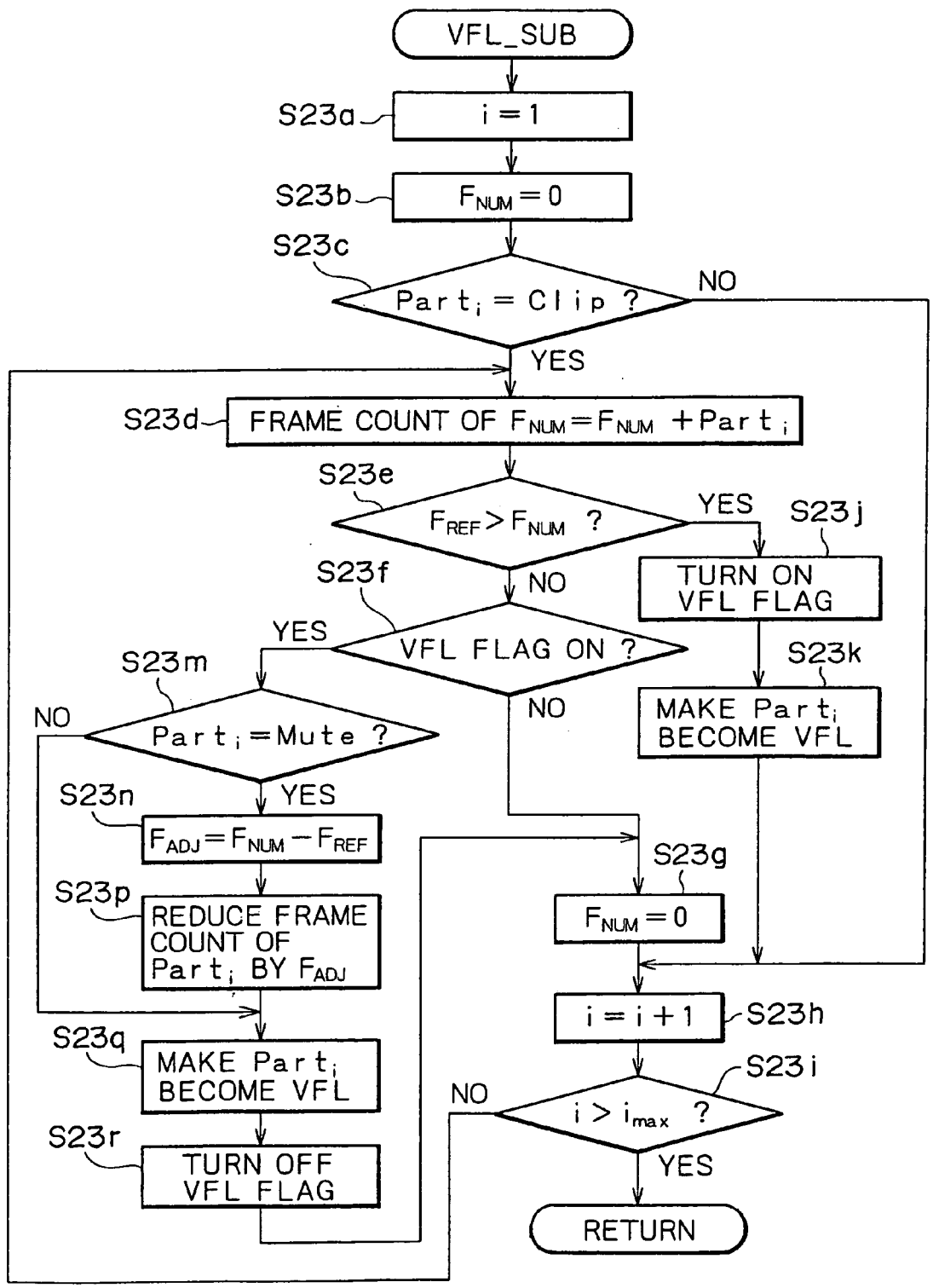

IMAGE EDITING APPARATUS AND RECORDING MEDIUM

BACKGROUND OF THE INVENTION

The present invention relates generally to an image editing apparatus for editing digital video signals. This image editing apparatus is suitably for use in editing systems of broadcast stations (for example, broadcast stations of broadcasting industries, office broadcast stations, and school broadcast stations) providing services such as broadcast communication for general public and simultaneous transmissive communication for specified members or in editing systems such as post-production.

Post-production herein denotes producing such titles (or video content) completed in terms of audio and video as broadcast programs, TV commercials, and video packages by use of sophisticated editing techniques and composing techniques on the basis of audio and video materials recorded on video tape, disk, film, and so on. Especially, post-production denotes the operation for carrying out these activities.

Generally, it is indispensable for broadcast stations and post-production companies to carry out jobs of cutting out necessary portions of material and connecting the cuts into desired video content. Conventionally, editing machines used for such editing jobs are so-called linear editing machines based on magnetic tape. However, because these tape-based machines are not capable of doing delicate editing jobs on a frame basis and take a long time in doing editing jobs, they are recently being replaced by digital nonlinear editing machines based on storage devices such as hard disk.

The nonlinear editing machine is capable of randomly accessing material in a frame basis. Therefore, the nonlinear editing machine is advantageous in doing delicate editing jobs and avoiding the deterioration of video signals by storing them in a digital format.

The editing jobs by nonlinear editing machines are substantially the same as those by linear editing machines. Namely, "rough editing" (necessary portions of material are roughly cut out and recorded) is executed first; then "fine editing" (precise cut-out is done on a frame basis) is performed on the results of rough editing.

A definite difference from the linear editing machine lies in that the nonlinear editing machine generates information about the results of the above-mentioned rough and fine editing jobs (this information is hereafter referred to as editing result information) and holds the generated information separately from the material to be edited. The editing result information includes the information for use in identifying materials to be edited and the information for use in identifying cut-out start and end points. On the basis of this editing result information, the nonlinear editing machine reproduces the material to be edited. In other words, while the linear editing machine performs editing directly on the material to be roughly edited itself, the nonlinear editing machine performs indirect editing by generating the above-mentioned editing result information without manipulating the rough edit material.

The editing result information is described in a format called an EDL (Edit Decision List). One EDL includes fine edit information (for example, place at which the material was taped, material name, edit point information, and so on) about all materials constituting one piece of video content. On the basis of this EDL, the nonlinear editing machine retrieves a predetermined portion (a portion specified by the edit point information, namely a fine edit portion) of each material from a storage device, connects the retrieved portions according to reproduction sequence information, and reproducibly outputs a series of resultant video content.

In terms of the storage capacity of these nonlinear editing machines for recording materials, however, the nonlinear editing machine is disadvantageous as compared with the linear editing machine using the magnetic tapes. Although the storage capacities of hard disk and other storage media have been remarkably increasing these days, the storage size of each device is several gigabytes at most. To compensate for this shortcoming, a nonlinear editing machine realizing a mass storage size has recently come into practical use by taking advantage storage device arraying technologies represented by RAID (Redundant Array of Inexpensive Disk).

Broadcasting stations and post-production companies are various in business size and irregular in the amount of materials to be handled. That is, the material storage size of the nonlinear editing machine differs from one editing system to another in general. Therefore, in order to enhance the flexibility of the system configuration, the storage size required for each editing system is satisfied by combining basic units of a storage system such as a hard disk system having a predetermined storage size. If the basic unit is called a volume for convenience, a small-scale editing system is equipped with the relatively small number of volumes while a large-scale editing system with the relatively large number of volumes, thereby flexibly coping with editing systems of various scales.

However, with a nonlinear editing machine having two or more volumes, the pieces of information of different volumes (in which recordings are stored) exist together in one EDL. This presents a problem of complicating the control of material reproduction to be executed according to the EDL.

If material is reproduced according to the EDL that includes plural pieces of information about storage devices of recordings, the nonlinear editing machine must sequentially retrieve the information about storage devices of recordings from one EDL and, on the basis of the retrieved information, execute control operations such as port switching in a properly timed relation. Originally, however, the EDL has been applied to nonlinear editing machines having a single volume. Therefore, the above-mentioned control such as port switching is an additional task, which consequently increases the control burden of the nonlinear editing machine.

SUMMARY OF THE INVENTION

It is therefore an object of the present invention to reconfigure the EDL such that there is only one piece of information about storage devices of recordings, thereby preventing the material reproduction control in nonlinear editing machines each having plural volumes from being needlessly complicated.

In carrying out the invention and according to one aspect thereof, there is provided a materials sending apparatus for creating an edit list of an material including one or both of video data and audio data and sending the material, comprising: edit list creating means for creating an edit list containing information associated with an edit point of the material and information associated with a destination on which the material is recorded; reconfiguring means for splitting the edit list for each recording destination on which the material is recorded and reconfiguring the edit list for the each recording destination; and materials output means for outputting the material edited on the basis of the reconfigured edit list.

In carrying out the invention and according to another aspect thereof, there is provided a materials sending method for creating an edit list of an material including one or both of video data and audio data and sending the material, comprising: a first step for creating an edit list containing information associated with an edit point of the material and information associated with a destination on which the material is recorded; a second step for splitting the edit list for the recording destination on which the material is recorded and reconfiguring the edit list for the recording destination; and a third step for outputting the material edited on the basis of the reconfigured edit list.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which:

FIG. 5 is a flowchart describing a VFL entering processing program;

FIG. 6 is a flowchart describing a VFL_SUB program;

DETAILED DESCRIPTION OF PREFERRED EMBODIMENTS

Now, preferred embodiments of the present invention will be described by use of a video server system installed in a broadcasting station for example with reference to drawings. It will be apparent to those skilled in the art that the present invention is not limited to the above-mentioned video server system. The present invention is applicable to any image editing apparatus having plural storage devices of recordings and any system that includes such an image editing system. For example, the present invention is applicable to an editing system used in post-production.

Figure 1:
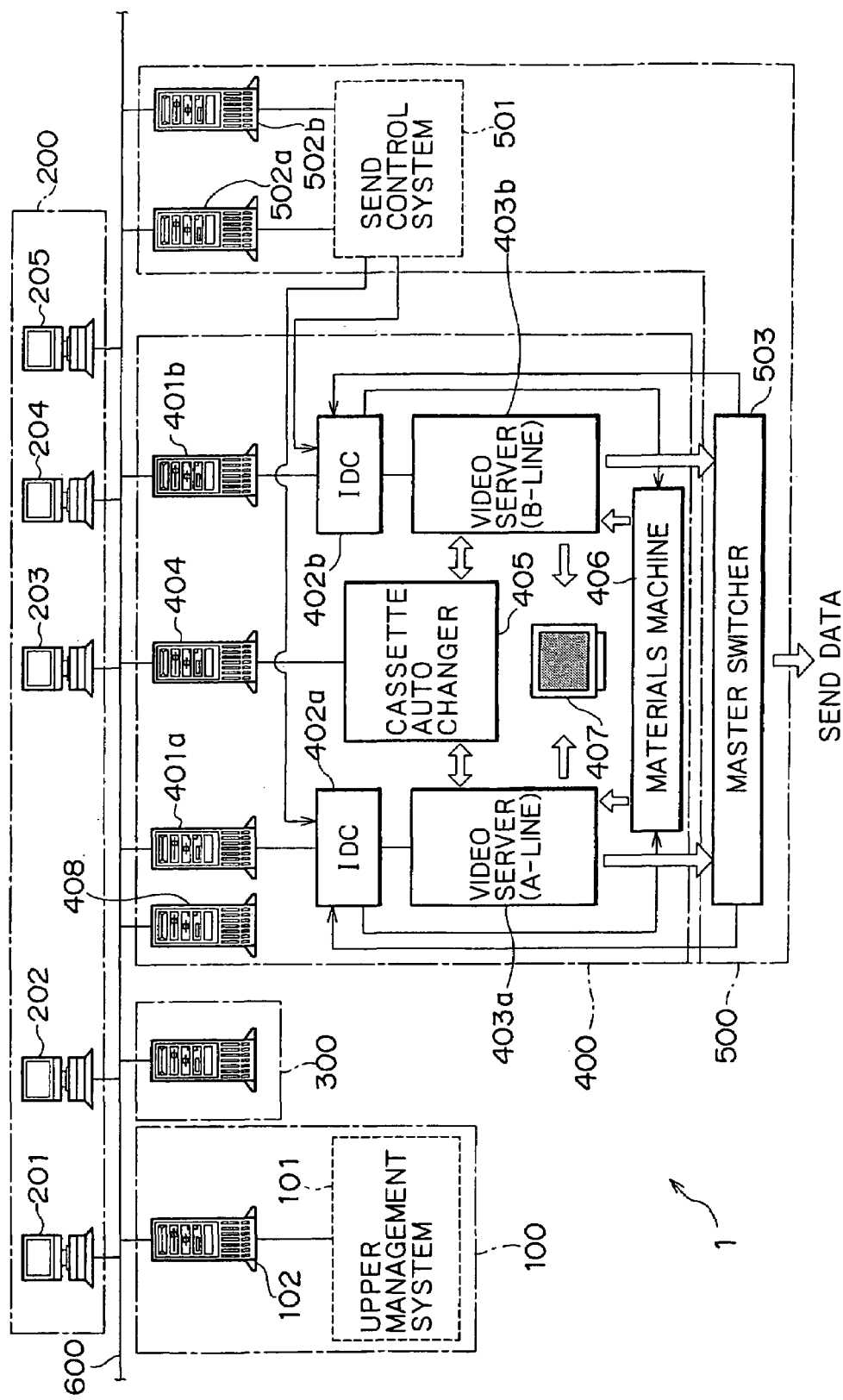
FIG. 1 is a schematic block diagram illustrating an overall configuration of a video server system.

Overall configuration of video server system 1:

FIG. 1 shows an overall configuration of a video server system 1. The video server system 1 can be classified by role into an in-station upper subsystem 100, an operator subsystem 200, a database subsystem 300, a mass storage subsystem 400, and a send-related subsystem 500.

These subsystems carry out their own roles to be described later. Each subsystem may include a personal computer or a workstation (hereafter generically referred to as a personal computer) with a general-purpose operating system, (OS) installed as needed to perform all of or a part of the roles efficiently and with low cost.

Especially, the operator subsystem 200, as will be clear from the following description, includes at least one unit (FIG. 1 show 5 units of this personal computer as an example) of a network-compatible personal computer (comprising a personal computer main mounted with a network card, a hard disk drive, and so on, a display device, and input devices such as keyboard and mouse for example) with a predetermined general-purpose OS (for example, Windows 95/98 or NT (trademark of Microsoft Corporation)), which is excellent in GUI (Graphical User Interface), thereby achieving good man-machine interface with operators.

Configuration of in-station upper subsystem 100:

The following describes a preferred configurational example of each subsystem. First, an in-station upper subsystem 100 has an upper management system 101 installed in a program production department for example. The upper management system 101 creates a schedule (a program configuration table) of broadcast programs for example.

It should be noted that, to be precise, the upper management system 101 is connected to a network belonging to a work group of a system different from the video server system 1. In order to construct a so-called WAN (Wide Area Network) by connecting this network to the video server system 1 (LAN-to-LAN connection), a data gateway 102 is installed in the in-station upper subsystem 100. The data gateway 102 shown is constituted by a network-compatible personal computer, in which two network cards for example are loaded in slots of the personal computer, one connected to the upper management system 101 and the other to a LAN 600 of the video server system 1, thereby enabling the selective transfer of necessary data between both the networks.

If the direction of data transfer from the upper management system 101 to the video server system 1 is "downstream" and the reverse direction is "upstream," then the downstream data include a schedule for example while the upstream data include a list of broadcast materials which have been broadcast (this list is called a send result list).

Configuration of operator subsystem 200:

The operator subsystem 200 has plural personal computers (5 units 201 through 205 as shown as an example) with a general-purpose OS excellent in GUI environment installed as described above. These personal computers are operated by staffs in charge of recording, editing, send monitoring, materials management, and system management for example respectively.

If these jobs are executed by a single person or these jobs are not executed simultaneously, only one unit of personal computer may be installed. Namely, the application programs for recording, editing, send monitoring, materials management, and system management (or a single application program with all these functions integrated) may be installed in one personal computer, starting one of these programs every time one of these jobs is to be executed.

Actually, however, the all or a part of above-mentioned jobs are often executed in parallel, so that it is preferable to install plural personal computers each for each of these jobs; the personal computer for recording (recording terminal) 201, the personal computer for editing (editing terminal)

202, the personal computer for send monitoring (send monitoring terminal) 203, the personal computer for materials management (material management terminal) 204, and the personal computer for system management (system management terminal) 205.

The recording job stores (or records) broadcast materials into the mass storage subsystem 400. The editing job edits, in a nonlinear manner, the broadcast materials stored in the mass storage subsystem 400. The send monitoring job monitors a send operation that follows a schedule of the broadcast materials stored in the mass storage subsystem 400. The materials management job manages the broadcast materials stored in the mass storage subsystem 400. The system management job manages the operating environment for example of the AV server system 1.

The terminals 201 through 205 are connected to the LAN 600 via network cards, not shown, loaded in the slots of these terminals. Each of these terminals may be installed in plural in preparation for the sharing of one job by plural staffs. For example, the editing terminal 202 may be installed in plural.

Configuration of database subsystem 300:

The database subsystem 300 includes a network-compatible database engine (for example, an SQL (Structured Query Language) database engine) and has a database table that allows the reference, update, and addition of record data with the terminals 201 through 205 of the operator subsystem 200 via this database engine. This database table includes the data supplied from the upper management system 101 and the data such as the system settings set by the system management-terminal 205.

General configuration of mass storage subsystem 400:

The mass storage subsystem 400 provides the nucleus of the video server system 1, one embodiment of the present invention. In fact, this is a mass storage hard disk array system built by taking advantage of known mass storage hard disk management technologies, typically RAID (Redundant Array of Inexpensive Disk).

It should be noted that RAID has four levels, RAID0, RAID1, RAID3, and RAID5, RAID0 is a so-called stripe set, in which plural hard disks are sequentially used on a block basis. RAID0 allows high-speed read and write operations at the expense of a low reliability (let the number of disks be n and failure probability be x, then the failure probability of entire system becomes $1-(1-x)^n$) RAID1 is a so-called mirror set (or a mirroring), in which same data are written to plural hard disks. RAID1 is characterized by that the failure of hard disks does not lead to the loss of data if at least one of them is normally functioning. The probability of data loss with RAID1 is $x^n$, which is very high, at the expense of a low disk usage efficiency.

RAID3 has, performance between RAID0 and RAID1. Namely, RAID3 is constituted by RAID0 plus a hard disk dedicated to parity (information for data recovery). The parity generated from the data located at the same logic block as the hard disc constituting RAID is written to this parity hard disk. If one of the hard disks fails, RAID3 can restore the damaged data by use of the data of the remaining hard disks and the parity stored on the parity hard disk. Therefore, RAID3 does not lose data unless the two hard disks including the parity hard disk fail. The failure probability of RAID3 is $n(n-1)/2 \times (x^2)$. This is lower than RAID1 but far higher than a single hard disk configuration. As compared with RAID1, RAID3 is remarkably higher in disk usage efficiency.

The drawback of RAID3 is that the access to parity hard disk always takes place every time data are written to any other hard disk, which may often cause a bottleneck in performance. RAID5 is the improvement of RAID3 in this point. RAID5 has no parity hard disk, distributing parity information to all hard disks. However, the disk usage efficiency and the reliability are the same as those of RAID3. The mass storage subsystem 400 shown uses, but not necessarily, RAID3 for storing video data and RAID1 for storing audio data.

In order to enhance fault resistance and be used as a daily server or an on-air server but not necessarily. The mass storage subsystem 400 is configured in its main portion, in a dual manner, A line and B line. The same materials data are stored in each of these lines. The A line has an SMS (Server Management System) 401a, an IDC (Intelligent Device Controller) 402a, and a video server 403a. Likewise, the B line has an SMS 401b, an IDC 402b, and a video server 403b. In addition, the mass storage subsystem 400 has a cassette controller 404 and a cassette auto changer 405, which are common to both the lines, a materials machine 406, which is controlled by the IDCs 402a and the 402b, a monitor device 407 for displaying preview images for example, and a command relay device 408.

The command relay device 408 provides command interface between the operator subsystem 200 and the mass storage subsystem 400 (for example, in a certain type of practical video server system, this command relay device 408 is constituted by two devices called a server management terminal and an EZMAX terminal). It should be noted that the functions of the command relay device 408 may be distributed to the operator subsystem 200 (the terminals 201 through 205) and the mass storage subsystem 400 (the SMS 401a and SMS 401b) to eliminate the necessity for installing the command relay device 408. However, in consideration of the difference in the configurations of the operator subsystem 200 and the mass storage subsystem 400 (for example, the number of terminals, the number of video servers, or the GUI functionality of these terminals) between users, it is desirable, from the viewpoint of general versatility, to provide the command relay device 408 between the operator subsystem 200 and the mass storage subsystem 400. The command relay device 408 can cancel the configurational differences, thereby providing flexible system configurations satisfying user needs. Further, the installation of the command relay device 408 can mitigate the processing loads of the operator subsystem 200 and the mass storage subsystem 400.

The monitor device 407 previews the broadcast materials read from the mass storage subsystem 400 according to commands given from the operator subsystem 200.

The cassette auto changer 405 is equivalent to the conventional tape-based send materials storage device. With the cassette auto changer can record data stored in the video servers 403a and 403b onto a magnetic tape as library data and is available as an emergency standby machine for the video servers 403a and 403b of both lines by use of these magnetic tape data.

The cassette controller 404 arbitrates the allocation of various resources of the cassette auto changer 405 in response to resource requests from the recording terminal 201, the editing terminal 202, and the send monitoring terminal 203. The basic functionality of this controller is similar to that of the SMS 401a and the SMS 401b, so that it will be described along with the description of the SMS functionality.

Figure 2:
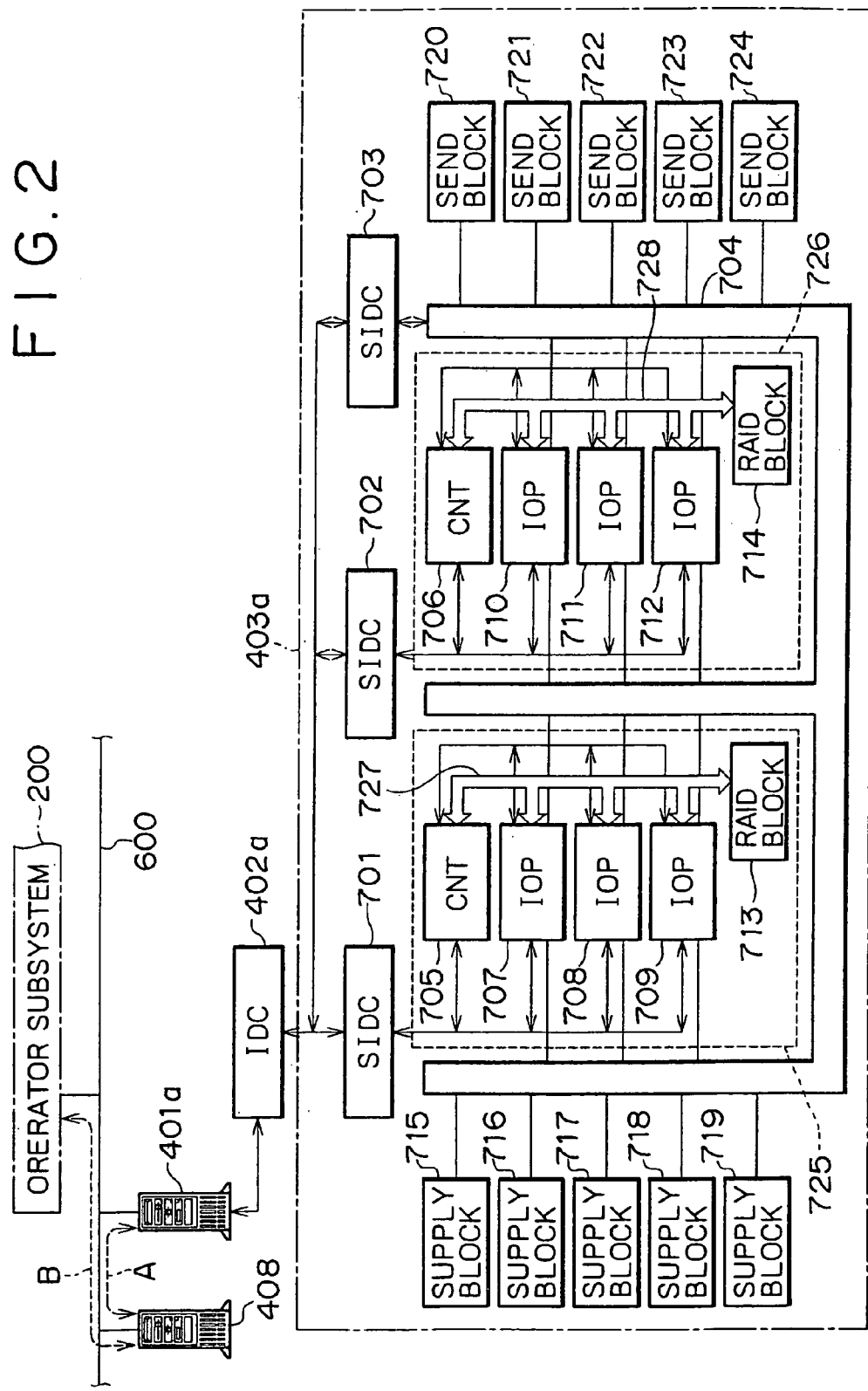
FIG. 2 is a schematic block diagram illustrating an A-line of a mass storage subsystem.

Detail configuration of mass storage subsystem 400:

Referring to FIG. 2, there is illustrated a configuration of one line (in this example, A line) of the mass storage subsystem 400. In the figure, supply blocks 715 through 719 and send blocks 720 through 724 are equivalent to the materials machine 406 shown in FIG. 1 and a switcher 704 is equivalent to a master switcher 503 shown in FIG. 1. Namely, the video server is portions enclosed by dashed lines (indicated by reference numerals 725 and 726) shown in FIG. 2 to be precise. However, in the following description, a portion (indicated by reference numeral 403a) enclosed by dot-dash lines is called the video server for the sake of convenience.

The SMS 401a is connected to the command relay device via the LAN 600 (refer to dashed line A) and the command relay device 408 is connected to the operator subsystem 200 (the terminals 201 through 205) (refer to dashed line B) via the LAN 600. The SMS 401a, along with the IDC 402a, arbitrates the allocation of various resources of the video server 403a in response to control commands supplied from the operator subsystem 200 (to be specific, the terminals 201 through 205) via the LAN 600 and the command relay device 408 and, at the same time, sends control commands to the IDC 402a. In response to these commands received from the SMS 401a, the IDC 402a executes realtime control in which the commands are executed with an internal timer or an external GPI (a control signal based on a manual operation) used as a trigger.

It should be noted that the resources herein denote such devices as the input/output channel for each volume (to be described later) of the video server 403a, the connection points of a switcher 704 (to be described later), and the hard disks constituting RAID. The terminals 201 through 205 of the operator subsystem 200 each can exclusively use the allocated devices during a period of the allocation.

The resource allocation must be executed dynamically in response to the requests from the terminals 201 through 205 of the operator subsystem 200. Static allocation requires the provision of resources in the number equal to the number of terminals of the operator subsystem. Therefore it is inefficient in system configuration and becomes unrealistic as the system scale increases. It should be noted that the employment of dynamic resource allocation requires measures for controlling the contention for particular resources and the priority in allocation. The SMS 401a provides the arbitration for the resource contention and the allocation priority (specific arbitrating operations will be described later).

As shown in FIG. 2, the video server 403a comprises n+1 (in the figure, n=2 for sake of convenience) sub IDCs (hereafter SIDCs) 701 through 703, the switcher 704 (which can change the combinations of input/output connection points according to control signals and therefore is likened to an exchange system), n controllers (CNTs) 705 and 706, m×n (in the figure, m= 3 for the sake of convenience) input/output processors (IOPs) 707 through 712, n RAID blocks 713 and 714, j (in the figure, j=5 for the sake of convenience) supply blocks 715 through 719, and j send blocks 720 through 724. The CNT 705, the IOPs 707 through 709, and the RAID block 713 constitute a first volume 725 (V1). The CNT 706, the IOPs 710 through 712, and the RAID block 714 constitute a second volume 726 (V2).

Consequently, the shown video server system 1 has the mass storage subsystem 400 having n volumes (the first volume 725 and the second volume 726) for each line. Because this mass storage subsystem 400 is used by the operator subsystem 200 (to be specific, the editing terminal 202) for nonlinear editing operations, the editing terminal 202 and the mass storage subsystem 400 integrally form a nonlinear editing machine equipped with plural volumes.

It should be noted that the CNT 705 and the IOPs 707 through 709 of the first volume 725 are connected to the RAID block 713 with a RAID bus 727 and the CNT 706 and the IOPs 710 through 712 are connected to the RAID block 714 with a RAID bus 728.

The first volume 725 and the second volume 726 are connected to the SIDCs 701 through 703, the supply blocks 715 through 719, and the send blocks 720 through 724 via the switcher 704. The send block 720 through 724 are connected to the master switcher 503 shown in FIG. 1. The supply blocks 715 through 719 are connected to the materials machine 406 shown in FIG. 1 and also to a VTR and a communications line, not shown. Thus, the materials data inputted in the supply blocks 715 through 719, namely the materials data supplied from the materials machine 406 or the VTR or the communications line can be recorded on the RAID block 713 and the RAID block 714 of the first volume 725 and the second volume 726 via the switcher 704.

Switching the connection point of the switcher 704 under the control of the SMS 401a can dynamically change the combinations of the IOPs 707 through 709 of the first volume 725 and the supply blocks 715 through 719 (or the send blocks 720 through 724) or the combinations of the IOPs 710 through 712 of the second volume 726 and the supply blocks 715 through 719 (or the send blocks 720 through 724).

For example, specifying the supply block 715 as the recording source and the IOP 707 of the first volume 725 as the recording destination permits the capture of the materials data set to this supply block 715 from the IOP 707 to record the captured materials data onto the RAID block 713 of the first volume 715.

Operations (especially arbitration of resource contention and resource allocation) of mass storage subsystem 400:

The following describes the operations of the SMS 401a and SMS 401b that arbitrate the resource contention and the resource allocation of the mass storage subsystem 400.

The SMS 401a and SMS 401b (hereafter represented by the SMS 401a of A line for the sake of convenience) has at least two tasks (an execution management task and a resource information management task) to be realized by the organic linking of software (the OS and predetermined application programs) and hardware.

"Task" denotes a unit of program execution controlled and managed at the OS level. For example, while MS-DOS (trademark of Microsoft Corporation) can manage only one task at a time (so-called single-tasking), Windows 95, 98, and NT, UNIX, and OS/2 (trademark of IBM Corp.) can manage two or more tasks at a time (so-called multitasking). When viewed from users, a task may be sometimes called a job. Recently, except for special applications, use of a single-tasking OS such as MS-DOS is rare; most applications use multitasking operating systems such as Windows 95, 98, NT, UNIX, and OS/2. Therefore, in the present embodiment, term "task" is used in consideration of this technological background (multitasking environment), but "task" may also be referred to as job or program.

The execution management task provides interface between the operator subsystem 200 and the IDC 402a. It should be noted that, actually, the command relay device 408 exists between the operator subsystem 200 and an execution management task 900 but, for the simplicity of description, the existence of the command relay device 408 is ignored.

Receiving a resource request command from the operator subsystem 200, the execution management task 900 inquires a resource management task whether resource allocation is enabled or disabled and sends a signal indicative of the inquiry result to the operator subsystem 200. In addition, receiving an actual operation command for resource allocation from the operator subsystem 200, the execution management task notifies the resource management task of the use of the resource concerned and, at the same time, transfers the operation command to the IDC 402a, notifying the operator subsystem 200 of a result (normal end or abnormal end) of the execution of the operation from the IDC 402a.

The resource management task holds, always in the most recent state, the current information about the resources to be managed by the SMS 401a, as a resource information database. For example, the resource information database contains tables listing user information, resource management information, materials information, connections information, open management information, and error information. The user information table manages the identification-information assigned to the terminals 201 through 205 of the operator subsystem 200 or the identification information assigned to the staffs positioned to these terminals. The resource management information table manages such information indicative of the current states of resources as resource names, resource types, resource group names, resource states, resource communication states, reserved user names, and reserved priorities. The materials information table manages the information about materials data accumulated in the video server 403a. The connections information table manages the information about the connections of resources. The open management information table manages the information about opened resources (currently used resources). The error information table manages the information about resources in which errors took place and the information about the details of these errors.

A resource requesting device (for example, one of the terminals of the operator subsystem 200) can issue a file open command (OPEN) of the following format for example:

OPEN [SN] [MD] [RSC] [PR] [USR]

[SN] denotes a command number, normally SN=1. If two or more commands continue, SN=2, SN=3, and so on. [MD] specifies file open mode. In reproduction mode, MD= PLAY and, in recording mode, MD=REC. [RSC] specifies a resource. For example, let RSC=HDS_1. AV1, then the IOP 707 of the first volume 725 shown in FIG. 2 is specified. The relationship between RSC and resource depends on the contents (especially resource names) of registration in the resource management information table.

[PR] specifies a priority. PR=100 denotes the lowest priority. As the value approaches zero, the priority rises. [USR] specifies the user information of the resource requesting side. For example, USR=USER_1 denotes the resource allocation request by a user named USER_1.

For example, upon reception of an OPEN command of MD=PLAY, RSC=HDS_1. VA1, PR=100, USR=USER_1, the execution management task sends these pieces of information to the resource information management task.

The resource information management task references the user information table, the resource management information table, the materials information table, the connections information table, the open management information table, and the error information table to determine whether the requested resource allocation is enabled or disabled. For example, the resource information management task rejects the resource allocation request if any of the following conditions is satisfied: (i) USER_1 is not registered in the user information table; (ii) the resource state of HDS_1. AV1 in the resource information management table is "unavailable"; (iii) the resource communication state of HDS_1. AV1 in the resource information management table is not "connected"; and (iv) the reserved user name of HDS_1. AV1 in the resource information management table is other than "none" and a value lower than PR=100 is set to the reserved priority. Otherwise, the resource information management task permits the request resource allocation and creates a new entry in the open management table. All of the above-mentioned conditions (i) through (iv) are resource allocation arbitrating conditions. Condition (iv) is the arbitrating condition for priority.

The resource information management task sends the information about the allocation request permission or rejection to the execution management task, which transfers this information to the resource requesting side (the operator subsystem 200). If the resource allocation is permitted, information called stream ID (for example, CSTAT SID=n, where n is a given integer) is transferred from the execution management task to the resource requesting side (the operator subsystem 200).

The stream ID is a unique identification code corresponding to the open command for which the resource allocation has been permitted. By receiving this stream ID, the resource requesting side (the operator subsystem 200) can know that the video server 403a is ready (namely, the standby state). Subsequently, by use of this stream ID, the operator subsystem 200 can sequentially issue control commands for the allocated resource.

For example, for reproduction, the operator subsystem 200 issues "PLAY SID=n". If the stream ID is not used, such a command including the information similar to that at the time of resource requesting as "PLAY REC=IOP_1 MD=PLAY PR=100". Thus the use of stream ID can simplify commands.

Configuration of send-related subsystem 500:

The send-related subsystem 500 includes an upper control system 501 (hereafter referred to as a send control system for the sake of convenience) installed in the send section, a send control gateway 502a of A-line and a send control gateway 502b of B-line for updating the table data in the database subsystem 300 according to the notification data (standby command, standby status data, and so on) supplied from the send control system 501, and the master switcher 503 shared by both A-line and B-line.

It should be noted that the send control system 501 sends the send play control information (PLAY command) to the IDC 402a of A-line and the IDC 402b of B-line and the master switcher 503 supplies on-air tally information (OA-TALLY command) to the IDC 402a and the IDC 402b.

Overall operation of video server system 1:

The following describes an overall operation of the video server system 1 practiced as one embodiment of the invention by use of a job of editing (rough editing and fine editing) the materials for a news program for example.

The news program materials include a library material or a video material (hereafter relayed material) supplied from a relay mobile for example. The library material is a material recorded beforehand on a magnetic tape by the cassette auto changer 405. Before recording, a cassette tape recorded with necessary library materials is set to a predetermined VTR. The relayed material is also sent to the broadcast station via a microwave communications system or a communications satellite to be inputted in the video server system 1 through a prearranged communications line.

For example, assume that the supply block 715 shown in FIG. 2 be connected to a predetermined VTR and the supply block 716 shown in FIG. 2 be connected to a predetermined communications line, then roughly editing the above-mentioned library materials or relay materials and recording the roughly edited materials in the mass storage subsystem 400 are executed in the following sequence. First, the recording terminal 201 is operated to send a request for resources including the supply block 715 or the supply block 716 to the mass storage subsystem 400. When a resource allocation permitted notification is received from the mass storage subsystem 400, the recording terminal 201 issues a recording start command to the mass storage subsystem 400. The above-mentioned library materials or relay materials are recorded in the RAID block 713 of the first volume 725 and the RAID block 714 of the second volume 726 via the supply block 715 and the supply block 716.

When finely editing materials recorded in the mass storage subsystem 400, the editing terminal 202 is operated to issue a resource allocation request to the mass storage subsystem 400. The resource allocation request is for the use of a particular send block (for example, the send block 720 for the sake of convenience) connected to the editing terminal 202, among the send blocks 720 through 724 of the mass storage subsystem 400. Receiving a resource allocation permitted notification (namely, the permission of the use of the send block 720) from the mass storage subsystem 400, the editing terminal 202 outputs a reproduction command for reproducing the material to be edited to the mass storage subsystem 400. In response to this command, the mass storage subsystem 400 reproduces the material to be edited and sends the reproduced material to the editing terminal 202 via the send block 720. The editing terminal 202 displays the received material on the display device on a frame basis and, at the same time, in response to the specification of edit points (so-called in-point and out-point) entered by the edit staff, generates edit result information of EDL format including the edit point information, materials name information, and materials recorded destination information (the information about the first volume 725 and the second volume 726). As for the other materials to be edited, the editing terminal 202 repeats the output of the above-mentioned resource allocation request and reproduction command and the specification of edit points. When the EDL data necessary for reproducing a sequence of video content composed of various fined edited materials have been generated, the editing terminal 202 stores these EDL data into the database subsystem 300, upon which the fine editing processing comes to an end.

Reconfiguration of EDL:

The video server system 1 practiced as one embodiment of the invention has n volumes (the first volume 725 and the second volume 726) for each line as described above. Consequently, materials to be fined edited may be scatteringly recorded over different volumes. If this happens, an EDL created by fine editing comes to have plural pieces of recording destination (volume) information, thereby incurring the problem described in the beginning herein (namely, the complicated control over materials reproduction).

To remove this problem, the present embodiment provides the following portions characteristic thereto to reconfigure the EDL having plural pieces of volume information into one having a single piece of volume information.

Figure 3:
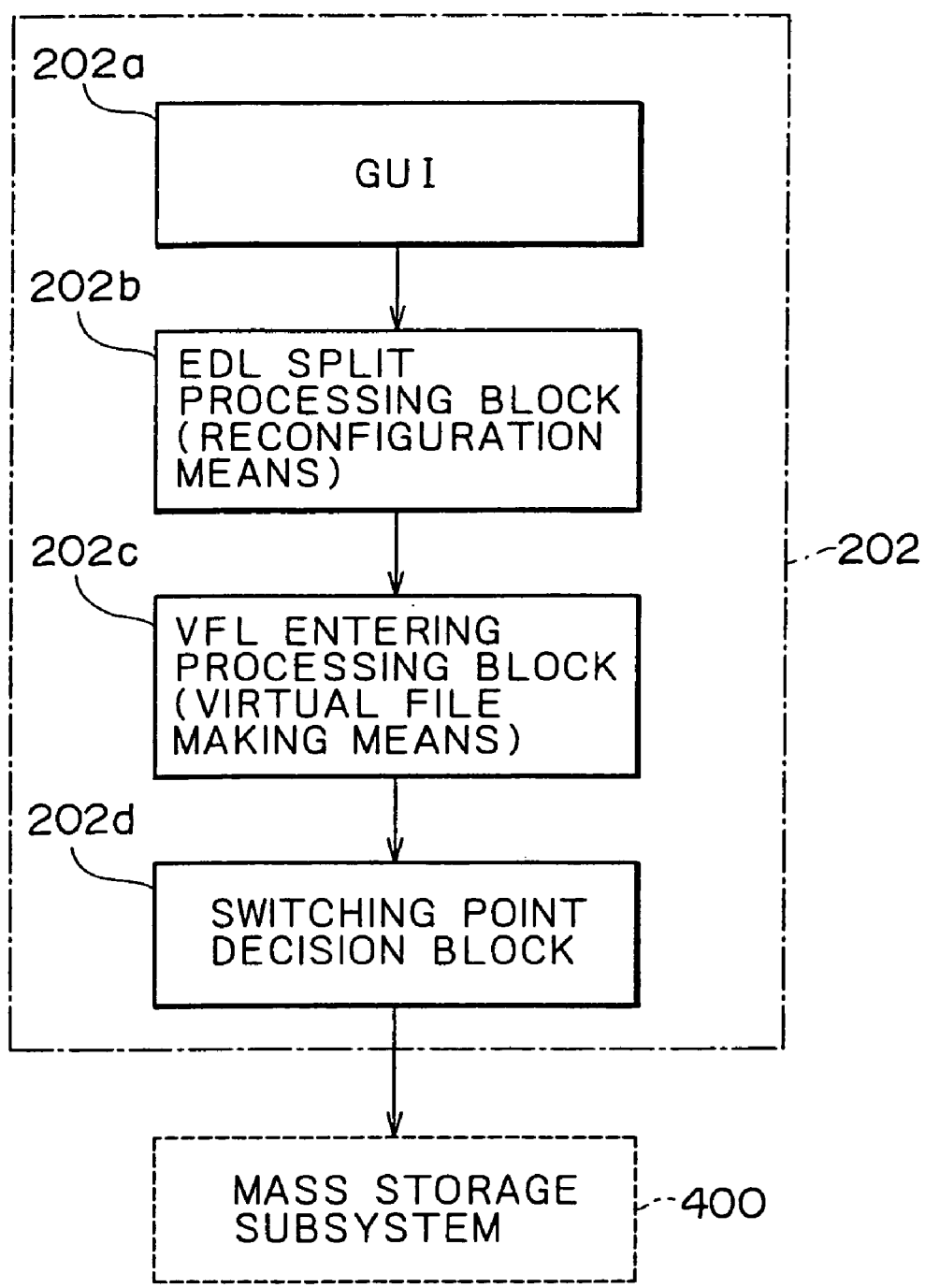
FIG. 3 is a functional block diagram illustrating a main section including a GUI, an EDL split processing block, a VFL entering processing block, and a switching point decision block.

Referring to FIG. 3, there is illustrated the above-mentioned portions in the present embodiment. In the figure, four portions, but not necessarily, are shown which are functionally realized by the organic coupling of the hardware and software of the editing terminal 202. Namely, a first portion is a GUI 202a for providing user interface to the operating staff of the editing terminal 202. The operating staff operates this GUI 202a to carry out the above-mentioned fine editing, thereby generating an EDL (including plural pieces of recording destination information). It should be noted that preferably the GUI 202a is, but not necessarily, graphics-based one that uses the GUI environment of the OS. The GUI 202a may also be non-graphics-based one that provides interface by commands inputted from the keyboard alone.

A second portion is an EDL split processing block 202b (equivalent to reconfiguring means recited in claims appended hereto). When a program to be described later (EDL split processing shown in FIG. 4) is executed, this EDL split processing block 202b creates plural $EDL_j$ having a single piece of volume information from an $EDL^j$ having plural pieces of volume information. For example, with an EDL having two pieces of volume information, V1 and V2, the EDL split processing block 202b generates an $EDL_1$ having only the V1 volume information and an $EDL_2$ having only the V2 volume information.

The essential point for the achievement of the present invention can be said concentrated onto this second portion, the EDL split processing block 202b. Essentially, the $EDL_j$ having no plural pieces of volume information is substantially the same as the conventional EDL applied to nonlinear editing machines based on a single volume. In this EDL, switching between volumes does not take place and therefore such additional control as port switching is not required. It should be noted that the specific processing of the EDL split processing block 202b will be described later.

A third portion (a VFL entering processing block 202c equivalent to the virtual file making means recited in the claims appended hereto) and a fourth portion (a switching point decision block 202d) are preferably provided for the following reasons.

Generally, the access speed of hard disk devices is limited by the seek speed of the read/write head. This is because the movements of the head are mechanical and therefore there is a limit to the attempts of increasing the head seek speed. Consequently, the head requires a non-negligible latency between a time when it accesses certain information and time when it accesses another information (a period in which the head moves to the storage location of this information). If this latency is converted into the number of image frames and referred to as $F_{REF}$, then $F_{REF}$ may becomes as large as two-digit figure (namely, several tens of frames) depending on the performance of the hard disk device. Thus, the conventional nonlinear editing machines configured on the basis of hard disk devices are limited in specifications that the interval between in-point and out-point of materials cannot be shortened below $F_{REF}$. This limitation is a drawback which is not negligible for nonlinear editing machines proclaiming fine editing on a frame basis. To remove this problem, the third portion (the VFL entering processing block 202c) and the fourth portion (the switching point decision block 202d) are provided. It should be noted that the specific processing operations of the third and fourth portions will be described later.

Figure 4:
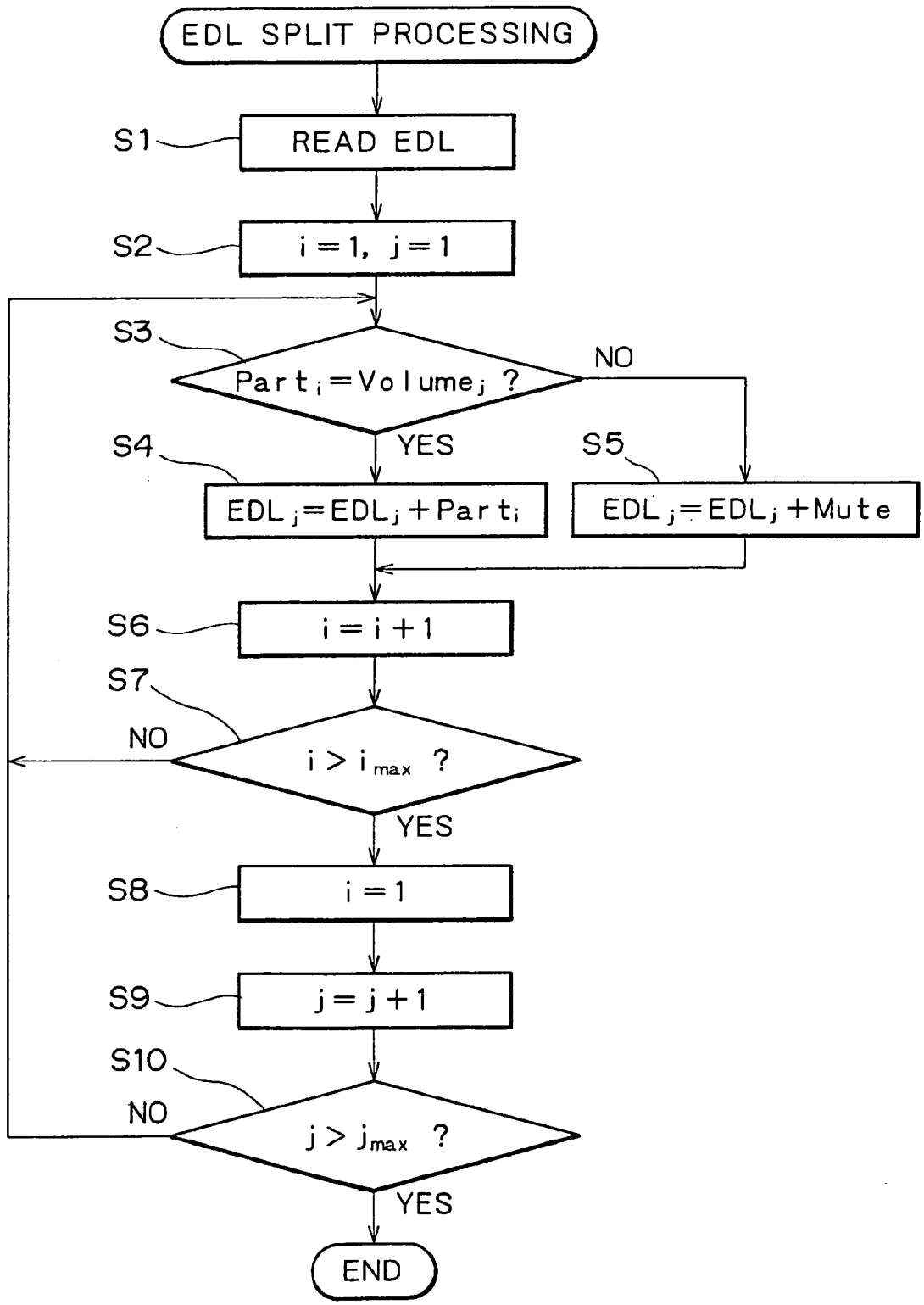
FIG. 4 is a flowchart describing an EDL split processing program.

EDL split processing:

FIG. 4 is, an outline flowchart describing an EDL split processing program which is executed in the EDL split processing block 202b. This program is executed when reproducing materials by use of an EDL generated by the GUI 202a. When this program is executed, the EDL concerned is read in step S1 first. In step S2, two counter variables (i and j) are set to 1 for initialization.

Figure 7A:
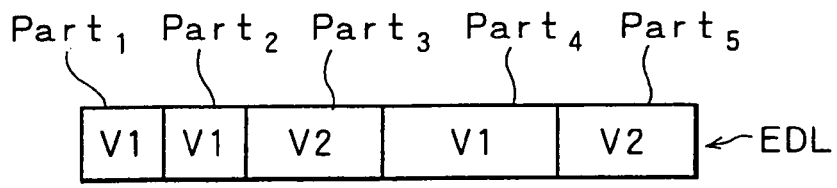
FIGS. 7A, 7B, 7C, 7D, and 7E are schematic diagrams illustrating EDL split processing and VFL entering processing.

Next, in step S3, equation "$Part_i = Volume_j$" is evaluated. $Part_i$ denotes the recording destination indicated by i-th element (a part in which information about the fine editing of one material is collected) of the EDL read in step S1. For example, if the EDL read in step S1 is composed of five elements (Part$_1$ through Part$_5$) as shown in FIG. 7A, then, when i=1, Part$_i$=V1; when i 2, Part$_i$=V1; when i=3, Part$_i$=V2; when i=4, Part$_i$=V1; and when i=5, Part$_i$=V2. Volume$_j$ denotes a j-th volume. Because the volumes in the present embodiment are two volumes (n=2), the first volume 725 (V1) and the second volume 726 (V2), when j=1, Volume$_j$=V1; and, when j=2, Volume$_j$=V2.

Consequently, the result of the evaluation of the equation in step S3 is, if the EDL is as shown in FIG. 7A, logically TRUE (YES) when i=1, i=2, or i=4 or logically FALSE, (NO) when i=3 or i=5 under the condition of j=1; under the condition of j=2, the result is logically FALSE when i=1, i=2, or i=4 and logically TRUE when i=3 or i=5.

Depending on the result, the process goes to step S4 or S5 to execute the EDL split processing. Namely, in step S4, Part$_i$ is linked with EDL$_j$ to generate EDL$_j$. In step S5, instead of Part$_i$, Mute (a dummy frame signal excluding audio and video information, a black burst signal for example) is linked with EDL$_j$ to generate EDL$_j$. In step S6, i is incremented by one. In step S7, it is determined whether i>imax (imax denotes the number of elements of the EDL; for example, imax=5 in the example shown in FIG. 7A). Steps 3 through 7 are repeated until i>imax. When i>imax is obtained in step S7, then, i is set to 1 in step S8. In step S9, j is incremented by one. In step S10, it is determined whether j>jmax (jmax denotes the number of volumes; in the present embodiment, max=2). Steps 3 through 10 are repeated until j>jmax. When j>jmax is obtained in step S10, the program comes to an end.

The above-mentioned processing flow will be described more specifically by use of the EDL shown in FIG. 7A for example. The shown EDL is composed of five elements Part$_1$ through Part$_5$. The recording destinations of the elements are V1, V1, V2, V1, and V2 respectively. Therefore, if i=1 when j=1, the equation in step S3 becomes V1=V1 and "EDL$_1$=EDL$_1$+Part$_1$" is executed in step S4. If i=3, the equation in step S3 becomes V2= V1 and "EDL$_1$=EDL$_1$+Mute" is executed in step S5. If i 4, the equation in step S3 becomes V1=V1 and "EDL$_1$= EDL$_1$+Part$_4$" is executed in step S4. If i=5, the equation in step S3 becomes V2=V1 and "EDL$_1$=EDL$_1$+Mute" is executed in step S5.

Figure 7B:
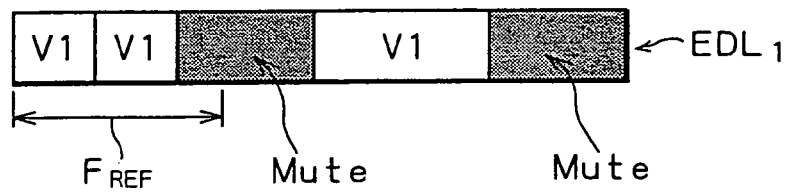

Consequently, a final string of the EDL$_1$ elements becomes V1, V1, Mute, V1, and Mute as shown in FIG. 7B, indicating that the EDL$_1$ contains only one recording destination (V1).

If i=1 when j=2, the equation in step S3 becomes V1=V2 and "EDL$_2$=EDL$_2$+Mute" is executed in step S5. If i=2, the equation in step S3 becomes V1= V2 and "EDL$_2$=EDL$_2$+Mute" is executed in step S5. If i 3, the equation in step S3 becomes V2=V2 and "EDL$_2$= EDL$_2$+Part$_3$" is executed in step S4. If i=4, the equation in step S3 becomes V1=V2 and "EDL$_2$=EDL$_2$+Mute" is executed in step S5. If i=5, the equation in step S3 becomes V2=V2 and "EDL$_2$=EDL$_2$+Part$_5$" is executed in step S4.

Figure 7C:
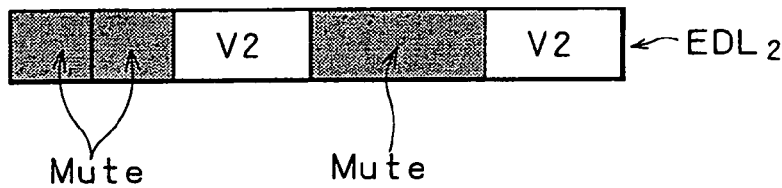

Consequently, as shown in FIG. 7C, a file string of EDL$_2$ elements becomes Mute, Mute, V2, Mute, and V2, indicating that the EDL$_2$ contains only one recording destination (V2).

As described, in the present embodiment, one EDL containing two or more different recording destinations can be divided or reconfigured into different EDLs (EDL$_1$ and EDL$_2$ in this example) each for each recording destination. Use of the reconfigured EDL$_1$ and EDL$_2$ allows the user to handle the mass storage subsystem 400 constituted by plural volumes as if it were a conventional single-volume nonlinear editing machine to reproduce materials, thereby providing advantages of preventing the control system for material reproduction from being complicated.

VFL (Virtual File List) entering processing:

As described, the VFL entering processing block 202c is intended for remove the limitations in the specifications of the hard disk device (namely, the inability to consecutively access the materials that follow F$_{REF}$) For example, if the total number of frames of Part$_1$ and Part$_2$ is less than F$_{REF}$ in FIG. 7B, the consecutive reproduction of the materials indicated by the element information of Part$_1$ and Part$_2$ is impossible. This is because, as described, the head seek speed of the hard disk device is too low. If the element (Part$_i$) corresponding to the above-mentioned limitation is found, the VFL entering processing block 202c creates a virtual file list (VFL) including that element according to the following rules:

(a) The frames of adjacent Part$_i$ are added and, when the sum exceeds F$_{REF}$, one VFL is provided.

(b) If the position of F$_{REF}$ is Mute in (a) above, adjustment is made such that this Mute is linked with VFL to provide F$_{REF}$.

(c) If there is no more Part$_i$ to be added before reaching F$_{REF}$ in (a) above, adjustment is made such that Mute is linked with VFL to provide F$_{REF}$.

The VFL holds physical data storage locations in the hard disk device as pointer information called file entry (FE) information and record entry (RE) information. One file entry is created for each VFL and one or more record entries are created for each VFL. Each file entry holds the names of virtual files and the pointer to the first record entry. Each record entry holds the pointer to a next RE and the last RE holds an end of file (EOF) information. Identifying a file entry by file name and following, from the identified file entry, the pointers to chain record entries allow access to a sequence of data in the virtual file.

Figure 7D:
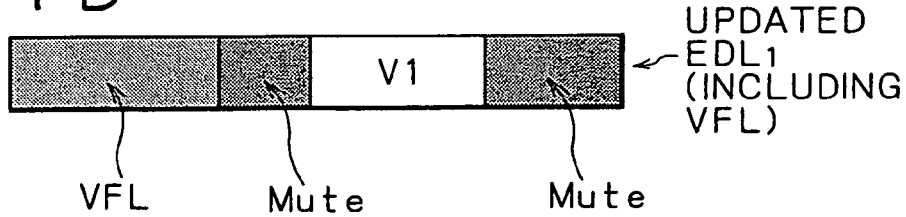

Referring to FIG. 7D, the shown VFL is composed of Part$_1$ and Part$_2$. This VFL portion is composed of two pieces of materials data to be recorded to V1 and an appropriate amount of Mute (refer to (b) above). Because the sum of frames matches F$_{REF}$, the shown VFL portion is not affected by the above-mentioned limitations in the specifications of the hard disk device (namely, the inability to consecutively access the materials that follow F$_{REF}$)

FIG. 5 shows an outline flowchart describing a VFL entering processing program to be executed by the VFL entering processing block 202c. When this program is executed, loop variable (j) is set to 1 for initialization in step S21. In step S22, EDL$_j$ is read. EDL$_j$ denotes EDL$_1$ and EDL$_2$ obtained by splitting one EDL by the EDL split processing block 202b for the volumes (V1 and V2). If j=1, EDL$_1$ is read in step S22; if j=2, EDL$_2$ is read in step S22.

When EDL$_j$ has been read, a VFL_SUB program to be described later is executed in step S23. In step S24, EDL$_j$ is updated. In step S25, j is incremented by one. Until j>jmax is determined in step S26, the steps S22 through S26 are repeated. When j>jmax is found in step S26, this program comes to an end.

VFL_SUB

FIG. 6 shows an outline flowchart describing the VFL_SUB portion of the above-mentioned VFL entering processing program. This program portion is a step subroutine program for the convenience of illustration.

When the VFL_SUB program is executed, loop variable (i) is set to 1 for initialization in step S23a. In step S23b, frame count variable (F$_{NUM}$) is set to 0 for initialization.

Next, it is determined whether $Part_i$ is "Clip" (a data element other than Mute) or not. If $Part_i$ is found not Clip, then i is incremented by one in step S23h. In step S23i, it is determined whether i>imax.

If $Part_i$ is found Clip, then the number of frames of $Part_i$ is added to $F_{NUM}$ in step S23d to update $F_{NUM}$ by the result. Because $F_{NUM}=0$ now, If i=1, the updated $F_{NUM}$ represents the number of frames itself of $Part_1$.

Next, equation "$F_{REF}>F_{NUM}$" is evaluated in step S23e. This equation determines whether $F_{NUM}$ at that time is lower than $F_{REF}$, which is the specification limitation of the hard disk device.

If the result of the evaluation is logically TRUE (YES), then the VFL flag is turned on in step S23j. In step S23k, $Part_i$, is set to be entered into VFL. In step S23h, i is incremented by one. In step S23i, it is determined whether i>imax.

If the result is logically FALSE (NO), then it is determined in step S23f whether the VFL flag is on or not. If the VFL flag is found off, $F_{NUM}$ is initialized in step S23g. In step S23h, i is incremented by one. In step S23i, it is determined whether i>imax. If the VFL flag is found on, then it is determined, in step S23m, whether $Part_i$ is Mute or not.

If the VFL is found not Mute, then, this $Part_i$ is set to be entered into VFL in step S23q. In step S23r, the VFL flag is turned off. In step S23h, i is incremented by one. In step S23i, it is determined whether i>imax.

On the other hand, if the VFL is found Mute, then a difference between $F_{NUM}$ and $F_{REF}$ is obtained in step S23n and the result is set to difference variable ($F_{ADJ}$). In step S23p, the number of frames of $Part_i$ is reduced by $F_{ADJ}$. In step S23q, the resultant $Part_i$ is set to be entered into VFL. In step S23r, the VFL flag is turned off. In step S23h, i is incremented by 1. In step S23i, it is determined whether i>imax.

The above-mentioned processing flow will be described more specifically by use of $EDL_1$ shown in FIG. 7B for example. If i=1, the element to be processed is $Part_1$ and, because this $Part_1$ indicates the information (other than Mute) of a material to be recorded on V1, so that the decision in step S23c is YES. In step S23d, the number of frames of $Part_1$ is set to $F_{NUM}$. As shown in FIG. 7B, the number of frames of $Part_1$ is obviously below $F_{REF}$, so that the decision in step S23e is YES. Consequently, the VFL flag is turned on in step S23j. In step F23k, the element currently to be processed ($Part_1$) is set to created in VFL.

Next, i is incremented by one in step S23h. In step S23i, it is determined whether i>imax. Because i=2 and therefore i is less than imax (imax=5), step S23d is executed again. Namely, the number of frames of $Part_2$ is added to $F_{NUM}$ to update the same. Because $F_{NUM}$ before the addition holds the number of frames of $Part_1$, a sum of the number of frames of $Part_1$ and the number of frames of $Part_2$ is obtained in step S23d and the result is set to $F_{NUM}$. As shown in FIG. 7B, the sum of the number of frames of $Part_1$ and the number of frames of $Part_2$ is obviously below $F_{REF}$, so that the decision in step S23e is YES. Consequently, in step S23k, the element ($Part_2$) to be processed currently is also set to be entered in VFL.

After incrementing i by one in step S23h, it is determined whether i>imax in step S23i. Because i=3 and therefore it is below imax (imax=5), step S23d is executed again. Namely, the number of frames of $Part_3$ is added to $F_{NUM}$ to update the same. Because $F_{NUM}$ before the addition holds a sum of the number of frames of $Part_1$ and the number of frames of $Part_2$, a sum of the number of frames of $Part_1$, the number of frames of $Part_2$ and the number of frames of $Part_3$ is obtained in step S23d and the result is set to $F_{NUM}$. As shown in FIG. 7B, the sum of the numbers of frames of $Part_1$ through $Part_3$ is in excess of $F_{REF}$, so that the decision in step S23e is NO, and because the VFL flag is on, the program goes to step S23m to determine whether $Part_3$ is Mute or not.

In this example, $Part_3$ is Mute. Therefore, in step S23n, $F_{REF}$ is subtracted from the current $F_{NUM}$ (the sum of the numbers of frames of $Part_1$ through $Part_3$) and the result is set to $F_{ADJ}$. In step S23p, the number of frames of $Part_3$ is reduced by $F_{ADJ}$. In step S23q, $Part_3$ is set to be entered in VFL. Then, in step S23r, the VFL flag is turned off.

Figure 7E:
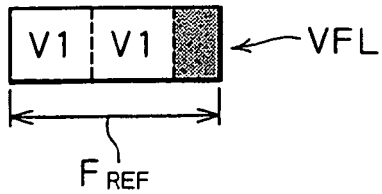

The above-mentioned processing operations generate one VFL having a structure shown in FIG. 7E. Use of this VFL circumvents the specifications limitation (namely, the inability to, consecutively access the materials subsequent to $F_{REF}$) of the mass storage subsystem 400, thereby permitting the fine editing on a frame basis, one of the advantages of nonlinear editing machines.

In other words, the two materials (each to be recorded onto V1) included in the VFL concerned are originally recorded independently on the first volume 725 of the mass storage subsystem 400. Because the number of frames of these materials corresponds to the specifications limitation of the mass storage subsystem 400, the consecutive access to materials is disabled. To circumvent this specifications limitation, each material is handled as a virtual file. This novel setup permits the consecutive access to materials to execute the fine editing on a frame basis, one of the advantages of nonlinear editing machines.

Figure 8A:
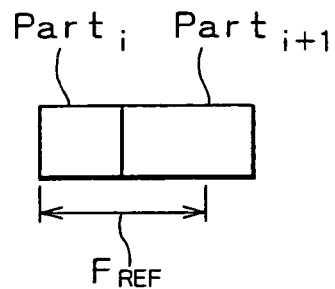
FIGS. 8A, 8B, and 8C are schematic diagrams illustrating several examples of VFL entering processing.
Figure 8B:
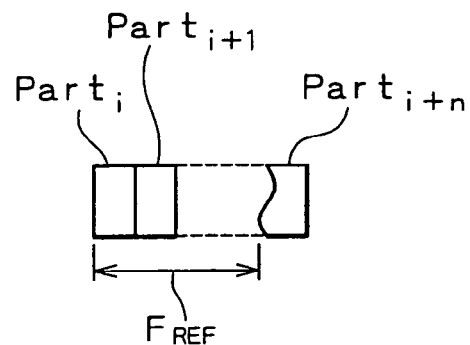
Figure 8C:
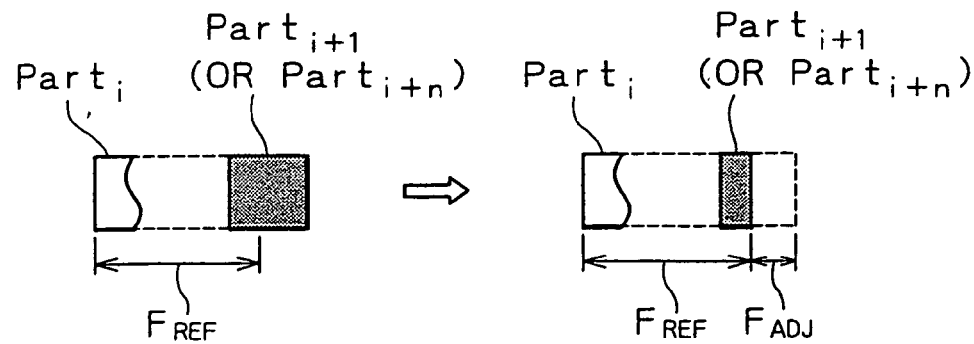

Referring to FIGS. 8A, 8B and 8C, there are shown several patterns of creating a VFL. FIG. 8A shows an example of VFL constituted by two elements having only Clip, namely including no Mute. In this example, a sum of the number of frames of $Part_i$ and the number of frames of adjacent $Part_{i+1}$ is in excess of $F_{REF}$. In this case, one VFL is constituted by $Part_i$ and adjacent $Part_{i+1}$.

FIG. 8B shows an example of VFL constituted by n (n>3) elements having only Clip, namely including no Mute. In this example, a sum of the number of frames of $Part_i$, the number of frames of adjacent $Part_{i+1}$, and the n number of frames of adjacent n-th $Part_{i+n}$ is in excess of $F_{REF}$. In this case, one VFL is constituted by $Part_i$, $Part_{i+1}$, and $Part_{i+n}$.

FIG. 8C shows an example of VFL in which n-th element is Mute. In this example, n-th $Part_{i+n}$ is Mute and a sum of the total number of frames is in excess of $F_{REF}$. In this case, one VFL is configured by reducing the number of frames of the last Mute by $F_{ADJ}$.

The reason of this reduction is that, because the frames of the last Mute are all identical, the reduction does not affect the image. In addition, minimizing the VFL length in correspondence with $F_{REF}$ permits reuse of already created VFLs and shortens the time necessary for preprocessing.

Namely, $F_{REF}$ tends to become large as the interval between materials storage locations increases. This is because the read/write head of the hard disk device must travel longer. Hence, it is desirable to execute preprocessing (so-called defragmentation for example) for shortening the interval between materials storage locations. This preprocessing may be executed on all materials. But, to prevent the overhead from being increased, only some of materials which are scatteringly located may be preprocessed.

Figure 9:
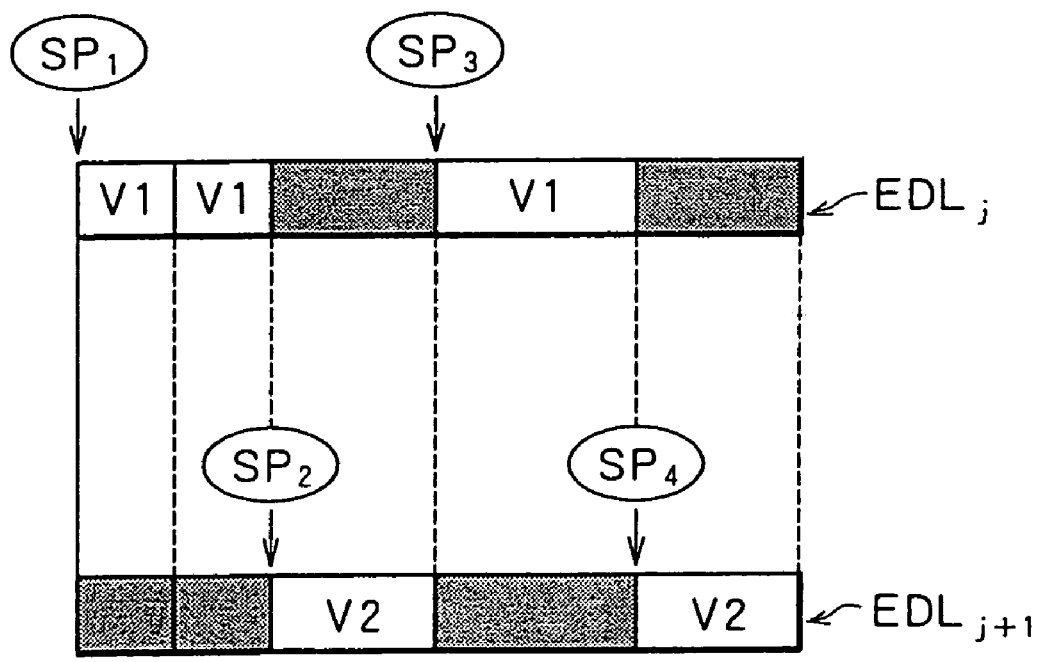
FIG. 9 is a schematic diagram illustrating switching point decision including no VFL.
Figure 10A:
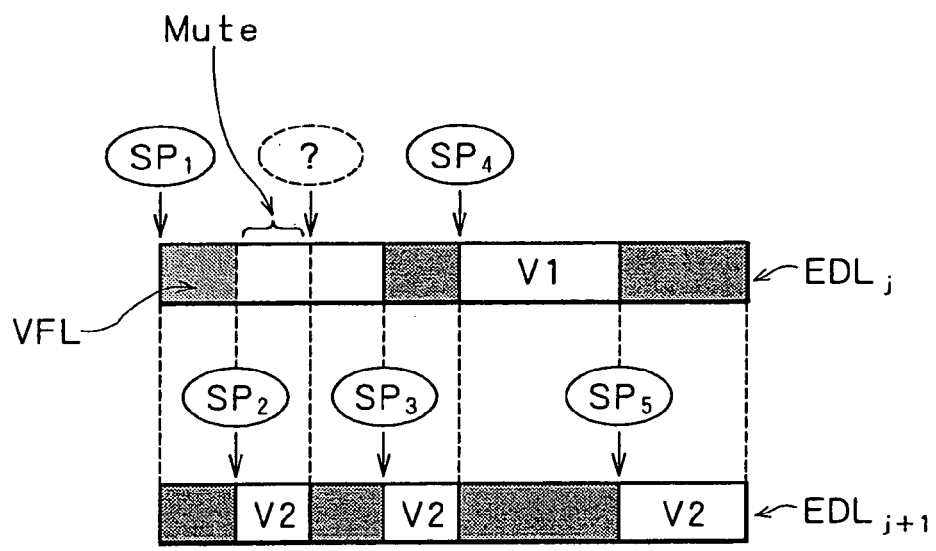
FIGS. 10A and 10B are schematic diagrams illustrating switching point decision including VFL.

Meanwhile, when several $Part_i$ are put in VFL in bulk, an elaborate plan must be worked out on the decision of the connection points of the switcher 704 (refer to FIG. 2). If no Part is put in VFL, the switching points ($SP_1$, $SP_2$, $SP_3$, and $SP_4$) of the volumes may be used as the connection points of the switcher 704 as shown in FIG. 9. If Parts have been put in VFL and if Mute is included in the VFL as shown in FIG. 10A for example, the end point (indicated by an interrogation mark) must be used as the connection point. But, because the information thereof is not included in the VFL, all connection points cannot be specified correctly (in the example of FIG. 10A, only switching points $SP_1$, $SP_2$, $SP_3$, $SP_4$ and $SP_5$ except for the interrogation mark portion can be specified).

Figure 10B:
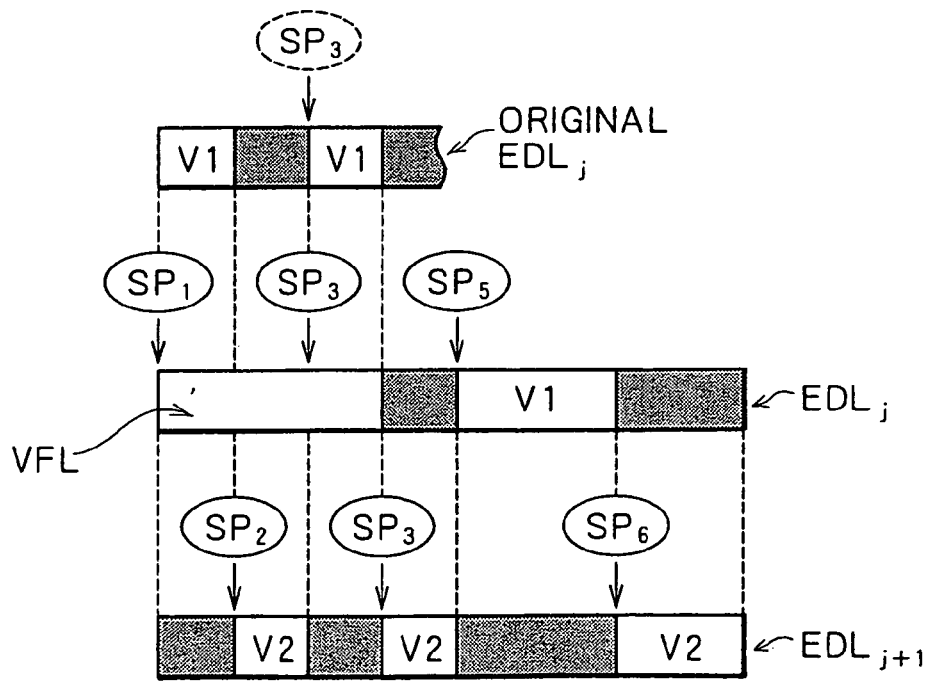

To overcome this problem, the original element portion set to be put in VFL are stored. In determining the connection point of the VFL portion, the stored information may be referenced to determine the end point ($SP_3$) of Mute in the VFL as the connection point as shown in FIG. 10B. This allows the correct specification of all of connection points $SP_1$, $SP_2$, $SP_3$, $SP_4$, $SP_5$, and $SP_6$. The switching point decision block 202d shown in FIG. 3 realizes this functionality.

As described and according to the invention, the following effects can be obtained for example:

(1) $EDL_j$ containing only single-volume information may be applied to a nonlinear editing machine having plural volumes, thereby preventing materials reproduction control functionality from being complicated.

(2) The specifications limitation (the inability to consecutively access materials subsequent to $F_{REF}$) of the hard disk device can be mitigated, thereby making the most of such an advantage of the nonlinear editing machine as the fine editing on a frame basis.

(3) The VFL length (the number of frames) is minimized in correspondence with $F_{REF}$, so that already created VFLs can be reused to reduce the overhead in VFL creation. In addition, when preprocessing such as defragmentation is executed in a unit of VFL, the preprocessing time can be reduced in correspondence with the VFL length, also reducing the overhead in VFL creation.

The main features of the present embodiment are functionally realized by the organic combination of the hardware resources including microcomputers and the software resources including the OS and various programs. Because the hardware resources and the OS used in the present embodiment are general-purpose ones, the entity essential for this invention is substantially the program portion for realizing the EDL split processing block 202b. Therefore, the present invention comprises storage devices such as floppy disc, optical disc, compact disc, magnetic tape, hard disc, and semiconductor memory that store all or main portions of the application program for realizing the EDL split processing or components (unit products, finished products, and semi-finished products) including these storage devices. It should be noted that the these storage devices or components include those commercially available in the form of packages and those of which recorded contents are available on networks.

While the preferred embodiments of the present invention have been described using specific terms, such description is for illustrative purposes only, and it is to be understood that changes and variations may be made without departing from the spirit or scope of the appended claims.

What is claimed is:

1. A materials sending apparatus for creating an edit list of a material including one or both of video data and audio data and for sending said material, comprising:

edit list creating means for creating the edit list that contains information associated with an edit point of said material and information associated with a destination on which said material is recorded;

reconfiguring means for reconfiguring said edit list as a function of each recording destination on which said material is recorded; and materials output means for outputting said material edited on the basis of the reconfigured edit list, wherein when said reconfigured edit list contains a material indicative of another recording destination, said reconfiguring means has rewriting means for rewriting said information to information for specifying the reproduction of dummy data in a range of said material indicative of another recording destination.

2. The materials sending apparatus according to claim 1, wherein said reconfiguring means, when the number of frames of said material to be put in said reconfigured edit list is less than a predetermined value, reconfigures said edit list to make said number of frames equal to said predetermined value by adding said dummy data to said material.

3. The materials sending apparatus according to claim 1, wherein when the number of frames of said material to be put in said edit list is less than said predetermined value, said reconfiguring means has reproduction file creating means for creating a reproduction file indicative of a reproduction start position and a reproduction end position of said material for said material to be put in said edit list.

4. The materials sending apparatus according to claim 3, wherein said predetermined value is a maximum value of a time for the reproduction of said material recorded on a recording medium to which nonlinear access is enabled.

5. The materials sending apparatus according to claim 3, wherein said predetermined value is a value obtained by converting, by the number of frames of said material, a time for the reproduction of said material recorded on a recording medium to which nonlinear access is enabled.

6. The materials sending apparatus according to claim 3, wherein said reproduction file is constituted by information indicative of a reproduction position of said material recorded on said recording medium from a recording start position of said material on said recording medium and information indicative of a reproduction end position corresponding to a length of said material to be reproduced from said reproduction start position.

7. The materials sending apparatus according to claim 3, further comprising, when said reproduction file is constituted by a plurality of materials, holding means for holding switching information indicative of a switching point between said plurality of materials, wherein said material output means has switching means for switching said plurality of materials at said switching point on the basis of said switching information held in said holding means.

8. The materials sending apparatus according to claim 7, wherein said switching information includes information indicative of a switching point in said predetermined value of said dummy data and said switching means switches said dummy data along with said plurality of materials, outputting a result of the switching.

9. A materials sending method for creating an edit list of an material including one or both of video data and audio data and sending said material, comprising:

a first step for creating an edit list containing information associated with an edit point of said material and information associated with a destination on which said material is recorded;

a second step for reconfiguring said edit list as a function of each recording destination on which said material is recorded; and a third step for outputting said material edited on the basis of the reconfigured edit list, wherein said second step further includes, when said reconfigured edit list contains a material indicative of another recording destination, a rewriting step for rewriting said information to information for specifying the reproduction of dummy data in a range of said material indicative of another recording destination.

10. The materials sending method according to claim 9, wherein said second step, when the number of frames of said material to be put in said reconfigured edit list is less than a predetermined value, reconfigures said edit list to make said number of frames equal to said predetermined value by adding said dummy data to said material.

11. The materials sending method according to claim 10, wherein said second step further includes, when the number of frames of said material to be put in said reconfigured edit list is less than said predetermined value, a reproduction file creating step for creating a reproduction file indicative of a reproduction start position and a reproduction end position of said material for said material to be put in said edit list, said material below said predetermined value being sent on the basis of said reproduction file.

12. The materials sending method according to claim 11, wherein said predetermined value is a maximum value of a time for the reproduction of said material recorded on a recording medium to which nonlinear access is enabled.

13. The materials sending method according to claim 11, wherein said predetermined value is a value obtained by converting, by the number of frames of said material, a time for the reproduction of said material recorded on a recording medium to which nonlinear access is enabled.

14. The materials sending method according to claim 11, wherein said reproduction file is constituted by information indicative of a reproduction position of said material recorded on said recording medium from a recording start position of said material on said recording medium and information indicative of a reproduction end position corresponding to a length of said material to be reproduced from said reproduction start position.

15. The materials sending method according to claim 11, wherein said second step further includes, when said reproduction file is constituted by a plurality of materials, a holding step for holding switching information indicative of a switching point between said plurality of materials, and said third step further includes a switching step for outputting said materials on the basis of the edit list and switching said materials on the basis of said switching information held.

16. The materials sending method according to claim 15, wherein said switching information includes information indicative of a switching point in said predetermined value of said dummy data and said third step switches said dummy data along with said plurality of materials, outputting a result of the switching.

* * * * *